(12) United States Patent
Bronstein et al.

(10) Patent No.: US 7,426,502 B2
(45) Date of Patent: Sep. 16, 2008

(54) ASSESSING HEALTH OF A SUBSYSTEM OR SERVICE WITHIN A NETWORKED SYSTEM

(75) Inventors: Alexandre Bronstein, Palo Alto, CA (US); Joydip Das, Palo Alto, CA (US); Sharad Singhal, Belmont, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1555 days.

(21) Appl. No.: 09/882,581

(22) Filed: Jun. 14, 2001

(65) Prior Publication Data

US 2003/0018494 A1    Jan. 23, 2003

(51) Int. Cl.
*G06F 17/00* (2006.01)
*G06F 19/00* (2006.01)
*G06F 15/16* (2006.01)
*G06F 15/18* (2006.01)
*G06F 7/00* (2006.01)

(52) U.S. Cl. ............... 706/47; 701/29; 705/2; 706/16; 709/203; 707/104.1

(58) Field of Classification Search .................. 706/47, 706/16, 52; 707/104.1; 701/29; 705/2; 709/203
See application file for complete search history.

(56) References Cited

U.S. PATENT DOCUMENTS 6,502,082 B1 *  12/2002  Toyama et al. ................ 706/16
6,574,537 B2 *   6/2003  Kipersztok et al. ............ 701/29
6,807,537 B1 *  10/2004  Thiesson et al. ............... 706/52
6,868,319 B2 *   3/2005  Kipersztok et al. ............ 701/29
2002/0052882 A1 * 5/2002  Taylor ..................... 707/104.1
2002/0138184 A1 * 9/2002  Kipersztok et al. ............ 701/29
2002/0143860 A1 * 10/2002 Catan ......................... 709/203
2003/0018494 A1 * 1/2003  Bronstein et al. .............. 705/2
2003/0167111 A1 * 9/2003  Kipersztok et al. ............ 701/29

OTHER PUBLICATIONS

Cynthia Steiz Hood—"Intelligent Detection for Fault Management of Communication Networks"—Sep. 1996—pp. 1-101—UMI Dissertation.

* cited by examiner

*Primary Examiner*—Albert Decady
*Assistant Examiner*—Sunray Chang

(57) ABSTRACT

A health assessor for assessing health of a target element within a multi-element system includes multiple sensors, each being operatively coupled to the target element to produce measures of the target element. The health assessor also includes measure collectors, each of which collects a measure from one of the sensor. In addition, the health assessor includes evaluators. Each evaluator evaluates at least a subset of all the measures collected by the measure collectors in accordance with (1) a predefined evaluation definition for the respective evaluator and (2) at least a subset of all historical measures to provide an assessment. A probabilistic reasoning network is coupled to the evaluators to receive the assessment from each of the evaluators and to combine all the assessments in accordance with a pre-configured reasoning definition so as to provide an overall health assessment of the target element. A health assessment system including the health assessor is also described.

19 Claims, 12 Drawing Sheets

|  | COOPERATION DEPENDENT | COOPERATION INDEPENDENT |
|---|---|---|
| LIGHT | MANAGEMENT APIs, MIB READINGS | OS SENSORS: CPU, MEMORY, I/O RATES... |
| MEDIUM | APPLICATION LOG ANALYSIS | ACTIVE TESTS, PROXY CLIENTS TESTS |
| HEAVY | OBJECT DIAGNOSTICS | OBJECT API INTERCEPT, REQ/RESP TIME, VERIFY |

*Figure 7*

ASSESSING HEALTH OF A SUBSYSTEM OR SERVICE WITHIN A NETWORKED SYSTEM

BACKGROUND OF THE INVENTION

1. Field of the Invention

The present invention pertains to system performance and health assessment. More particularly, this invention relates to autonomously assessing health of a computing hardware or software element or a service in a networked system using statistical analysis and probabilistic reasoning.

2. Description of the Related Art

To date, the management of a multi-element system (either a hardware system or a software system) is typically done by monitoring many variables of the system operation across time, and by noting the occurrence of abnormal events in the system. One prior art approach of determining the abnormal events employs predetermined static threshold values, as shown in FIG. 1. The threshold value used is typically based on experience and/or intuition.

The observed and monitored information is then presented to a system administrator. The system administrator is a human being who, based on the information received, assesses the "health" of each of the elements of the system. As is known, this assessment by the system administrator is essential in trouble-shooting existing problems, or in trying to detect failures early, before they propagate to users of the system.

Improvements have been made in the past to this prior art approach. For example, the collection of the monitored information can now be done by using agents to monitor particular "managed objects" and report their findings to a central management console (or a hierarchically organized set of consoles). Another example is the use of tree-based GUI (Graphic User Interface), some with geographic mapping, to improve the presentation of the monitored information, thus making it easier for the system administrator to navigate the managed objects. Embedded graphing packages make it easier for the system administrator to notice trends and trend changes.

However, even with these improvements, the prior art approach is still not suitable for measuring large dynamic distributed systems with large numbers of elements. A distributed system typically operates in a distributed or federated computing environment. One example of such a distributed system is the Internet.

One key reason for the unsuitability is that the prior art approach requires the human system administrator to make the assessment. There are a number of disadvantages to this requirement. One disadvantage is that for an always-on system, system administrators must be staffed around the clock. In addition, as the number of elements and the complexity of a monitored system increase, the system administrators typically work under greater and greater stress.

Another disadvantage is that the health assessment is a knowledge intensive task. It typically requires significant experience to perform the assessment accurately since patterns are learned over time. This means that companies hiring system administrators must pay higher salaries for the experience. As more and more companies migrate to the Internet, the demand for experienced system administrators grows accordingly. As a matter of fact, it is well known that the demand for such system administrators greatly exceeds the supply.

Prior attempts have been made to address this issue. One prior attempt employs neural network technology to automatically predict upcoming system failures. However, this prior attempt does not address the issue of assessing health of an element or service within a distributed system. Another disadvantage of this prior attempt is that system-specific training is required before the neural network system can be deployed. This prevents the prediction system from being widely adopted or applied.

SUMMARY OF THE INVENTION

One feature of the present invention is to autonomously assess health of a software or hardware computing element or a service within a system.

Another feature of the present invention is to minimize the engineering cost of providing health assessment for computing elements of broadly varying structures.

A further feature of the present invention is to minimize the labor-intensive process of assessing health of elements of a system using experienced personnel.

Below described is a health assessor for assessing health of a target element in a multi-element system. The health assessor includes multiple sensors, each being operatively coupled to the target element to produce measures of the target element. The health assessor also includes measure collectors, each of which collects a measure from one of the sensor. In addition, the health assessor includes evaluators. Each evaluator evaluates at least a subset of all the measures collected by the measure collectors in accordance with (1) a pre-configured evaluation definition for the respective evaluator and (2) at least a subset of all historical measures to provide an assessment. A probabilistic reasoning network is coupled to the evaluators to receive the assessment from each of the evaluators and to combine all the assessments in accordance with a pre-configured reasoning definition so as to provide an overall health assessment of the target element in the form of a probability that the element is healthy at that moment.

A health assessment system for assessing health of a target element in a multi-element system is also described. The health assessment system includes a health assessor that receives measures of the target element and provides health assessment of the target element based on the measures and historical measures of the target element that have already been stored in the health assessment engine. A result formatting module then formats the health assessment into a report. A web interface then transmits the formatted report to remote access systems via the Internet.

Other features and advantages of the invention will become apparent from the following detailed description, taken in conjunction with the accompanying drawings, illustrating by way of example the principles of the invention.

BRIEF DESCRIPTION OF THE DRAWINGS

FIG. 7 shows the types of sensors adopted by the health engine of FIG. 4.

DETAILED DESCRIPTION OF THE INVENTION

Figure 2:
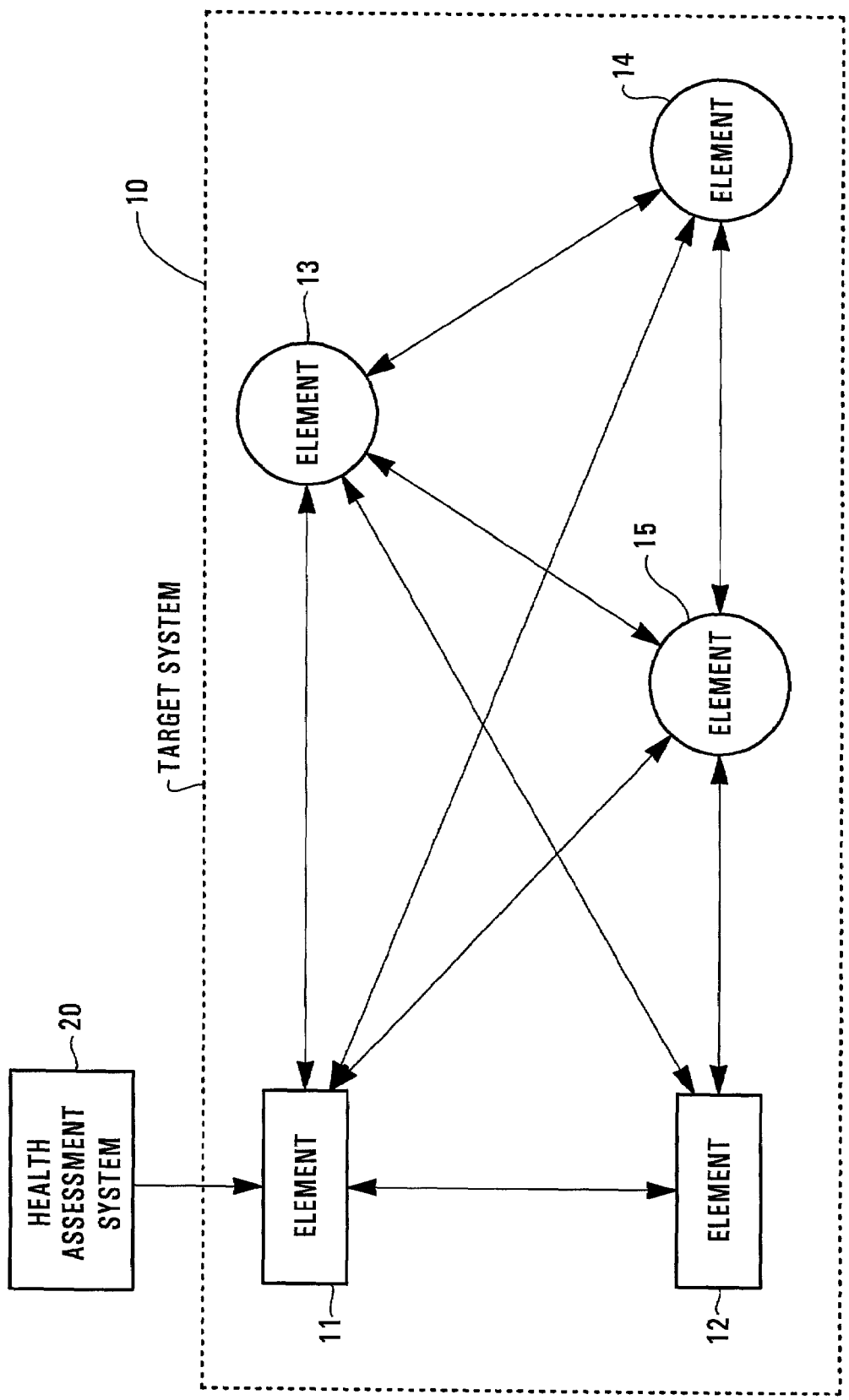
FIG. 2 schematically shows a health assessment system that assesses health of one element of a multi-element target system in accordance with one embodiment of the present invention.

FIG. 2 shows an overview of a target system 10, with one of its elements (i.e., element 11) being monitored by a health assessment system 20. In accordance with one embodiment of the present invention, the health assessment system 20 assesses the health of the element 11 of the target system 10. Alternatively, the health assessment system 20 may assess the health of the target element 11 by receiving measures from other elements in the system 20 in addition to the measures received from the element 11. To assess the health of the entire target system 10, each of the elements (i.e., elements 11-15) may be monitored and assessed by a system identical to the health assessment system 20.

FIG. 2 only illustratively shows the target system 10, which includes the elements 11 through 15 that are operationally connected together. In practice, the number of elements within the system 10 can be more or fewer than those shown in FIG. 2. In addition, the system 10 may take a different configuration from the configuration shown in FIG. 2.

The target system 10 can be any kind of system. In one embodiment, the system 10 is a distributed software application running on a federated or distributed computing environment. This means that the elements 11-15 of the system 10 are not physically located at a single location or place. In another embodiment, the system 10 is an Internet or Intranet system. In this case, each of the elements 11-15 can be either a web server, an Internet gateway system, or a proxy server. In a further embodiment, the system 10 is an email system.

Each of the elements 11-15 within the system 10 represents a computing hardware, a software object, or a service (e.g., web service or e-commerce service). For example, if the target system 10 is an Internet or Intranet system, each of the elements 11-15 may represent a service. In this case, the element 11 may represent an e-mail service with the element 12 representing a web service, the element 13 representing an e-commerce service (e.g., e-payment service), and the elements 14-15 representing other services. As a further example, if the target system 10 is an ISP (Internet Service Provider) system, then each of the elements 11-15 may represent one of the servers within the system. In this case, the element 11 may represent the proxy server, the web server, or the domain name server of the system. In other words, each of the elements 11-15 can be a hardware or software element or a more abstract service.

A feature of the target system 10 is that each of the elements 11-15 is inter-dependent of another in terms of its function and operation. This means a failure of one element is likely to affect the operation of the other elements. In addition, the dependency between the elements 11-15 is dynamic and not fixed.

In accordance with one embodiment of the present invention, the health assessment system 20 autonomously assesses the health of the element 11 of the target system 10. Here, the term "health" means whether the element 11 presently operates or functions normally.

The health assessment system 20 makes the above-mentioned health assessment of the element 11 by first putting sensors (see FIG. 4) logically adjacent to the element 11. This means that the sensors can be placed in, on, over, near, around, or far from the element 11, as long as they can get information about the element's behavior, or its impact on the operating environment. This also means that the some of the sensors can be logically related to the element 11. The sensors of the health assessment system 20 take various measures of the element 11 (or logically related to the element 11). The health assessment system 20 then makes the assessment. This is done by evaluating both the present and past measures of the element 11 using statistical analysis and arbitrary predicates to yield multiple individual assessments. Then the health assessment system 20 employs probabilistic reasoning technology to combine multiple individual assessments into a single probabilistic assessment of health of the element 11.

As a result, the health assessment system 20 automates a very labor-intensive process of assessing health of a computing element that currently requires experienced system administrators to perform. Moreover, the health assessment system 20 provides a convenient way to engineer customized health assessment machinery for a very broad variety of hardware and/or software elements, including high level "e-services". Furthermore, the health assessment system 20 helps alleviate any engineering problem caused by large and ever increasing variety of computing elements to be managed.

Another advantage of the health assessment system 20 is that it has a very general modular architecture (see FIG. 3 and to be described below). This reduces the customization effort. This in turn minimizes the engineering cost of providing health assessment for software, hardware, or services.

In addition, the health assessment system 20 includes Internet access capability to allow the final probabilistic assessment to be transferred to a remote system via Internet. The remote system can be an accessing terminal, an application, or the target element 11 itself. This means that the health assessment system 20 transports the health assessment information to remote systems (e.g., Internet access terminals, applications, or the target element 11 itself) using standard communication protocols (e.g., HTTP (Hyper Text Transport Protocol)), and standard web information description languages (e.g., XML (Extensible Markup Language), or HTML (Hyper Text Markup Language)). This allows the health assessment information to be expressed in a very universal manner. This also enables new models of health information flow, such as peer-to-peer, which is more suited to the dynamic web-based services. It also provides a single "first approximation" health semantic for all computing elements, from hardware, to software, to abstract services. This leads to the construction of fault-detection and fault-location software that could span all levels of computing elements with a single module.

In one embodiment, the health assessment system 20 is a software system. Alternatively, the health assessment system 20 can be implemented by hardware or firmware. The structure and operation of the health assessment system 20 will be described in more detail below, also in conjunction with FIGS. 3-7.

Figure 3:
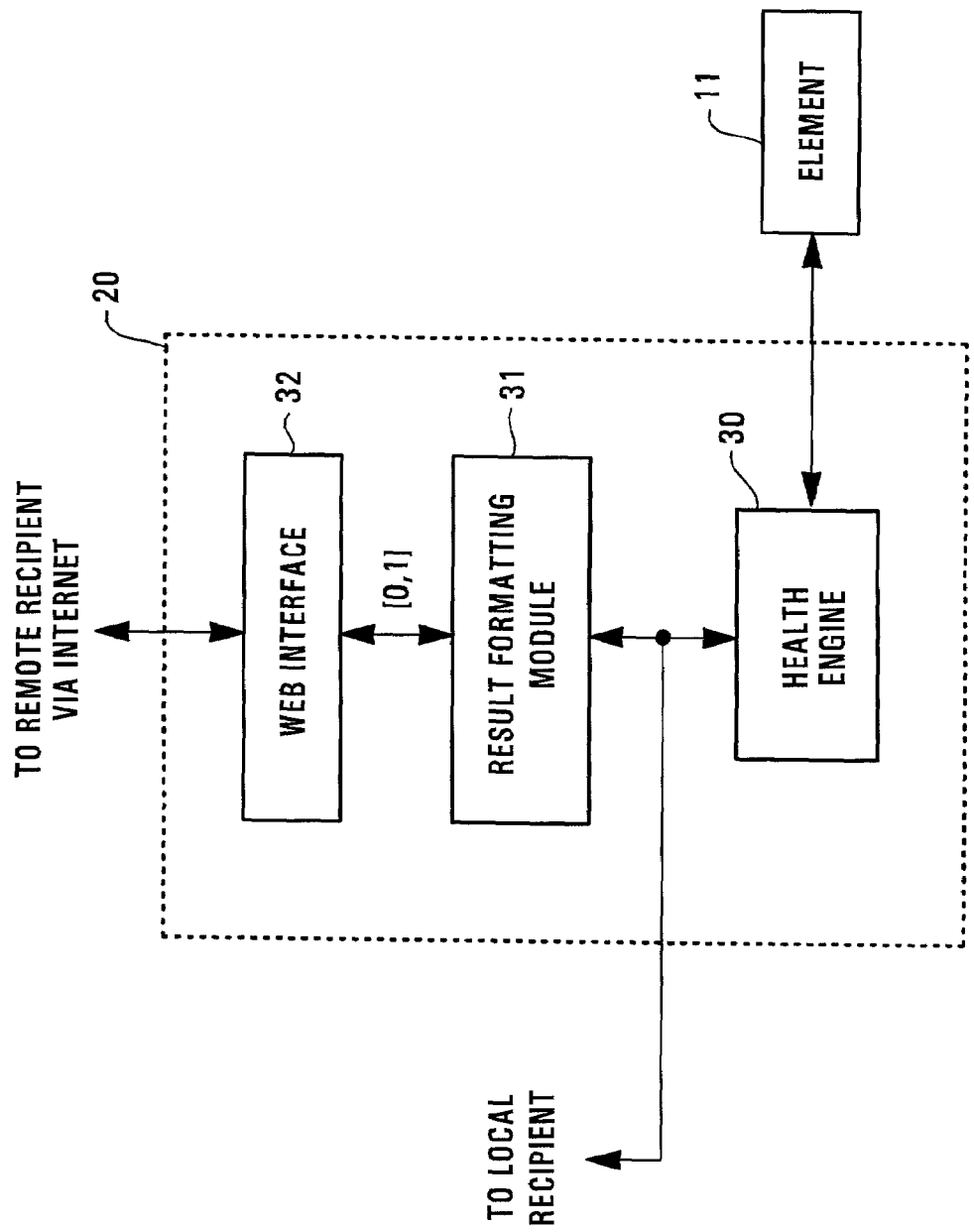
FIG. 3 shows the structure of the health assessment system of FIG. 2.
Figure 4:
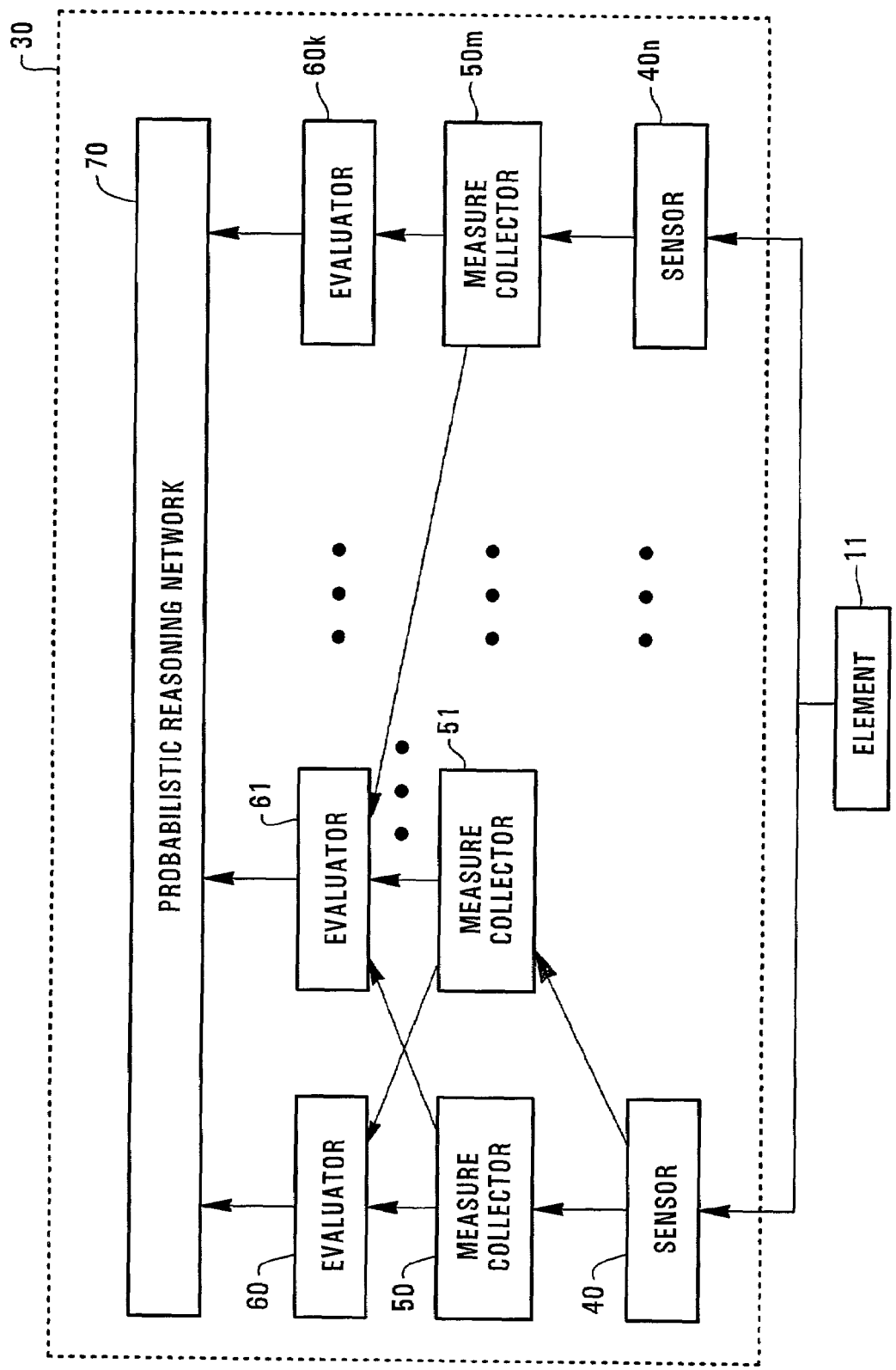
FIG. 4 shows the structure of the health engine of the health assessment system of FIGS. 2-3, wherein the health engine includes multiple sensors, multiple measure collectors, multiple evaluators, and a probabilistic reasoning network.

Referring to FIG. 3, the health assessment system 20 includes a health engine 30, a result formatting module 31, and a web interface 32. FIG. 3 also shows the element 11. The health engine 30 is the main engine of the health assessment system 20, and performs the health assessment of the element 11. The output of the health engine 30 is a probability (a real number between ZERO and ONE (e.g., 0.099 or 0.45)) representing the probability that the element 11 is healthy at this moment (or during the last measurement interval). It is to be noted that this health assessment of the element 11 by the health engine 30 is a probabilistic assessment of the health of the element 11. FIG. 4 shows in more detail the structure of the health engine 30, which will be described in more detail below.

Referring to FIG. 4, the health engine includes a number of sensors 40 through 40n, a number of measure collectors 50 through 50m, a number of evaluators 60 through 60k, and a probabilistic reasoning network 70. FIG. 4 also shows the element 11 to be assessed. The probabilistic reasoning network 70 produces the final health assessment probability of the element 11 based on the measures taken by the sensors 40-40n. The result formatting module 31 (shown in FIG. 3) produces the XML report. The sensors 40-40n can be software and/or hardware sensors, and can be any kinds of known tools which give some information about the behavior or performance of the target element 11. FIG. 7 shows some types of the sensors.

As can be seen from FIG. 7, sensors may or may not require detailed knowledge of the element 11 and may or may not require the cooperation of the element 11.

Examples of measurements that require the knowledge and cooperation of the element are measurements obtained using measurement API (Application Programming Interface) calls, MIB (Management Information Base) data, application logs, and diagnostic output from the element 11.

Examples of measurements that do not require detailed knowledge or cooperation of the element 11 include those available from the operating system (e.g., CPU and memory utilization, I/O transmission rates, etc.). Other examples include measurements made through active testing, dummy clients (proxy clients), result verification modules, test sensors, and request/response time sensors, etc.

Sensors can be simple or complex. They can be light, medium, or heavy, depending on their performance impact on the target element 11. Thus, a sensor can be a cooperation dependent light sensor or a cooperation independent heavy sensor.

Figure 8:
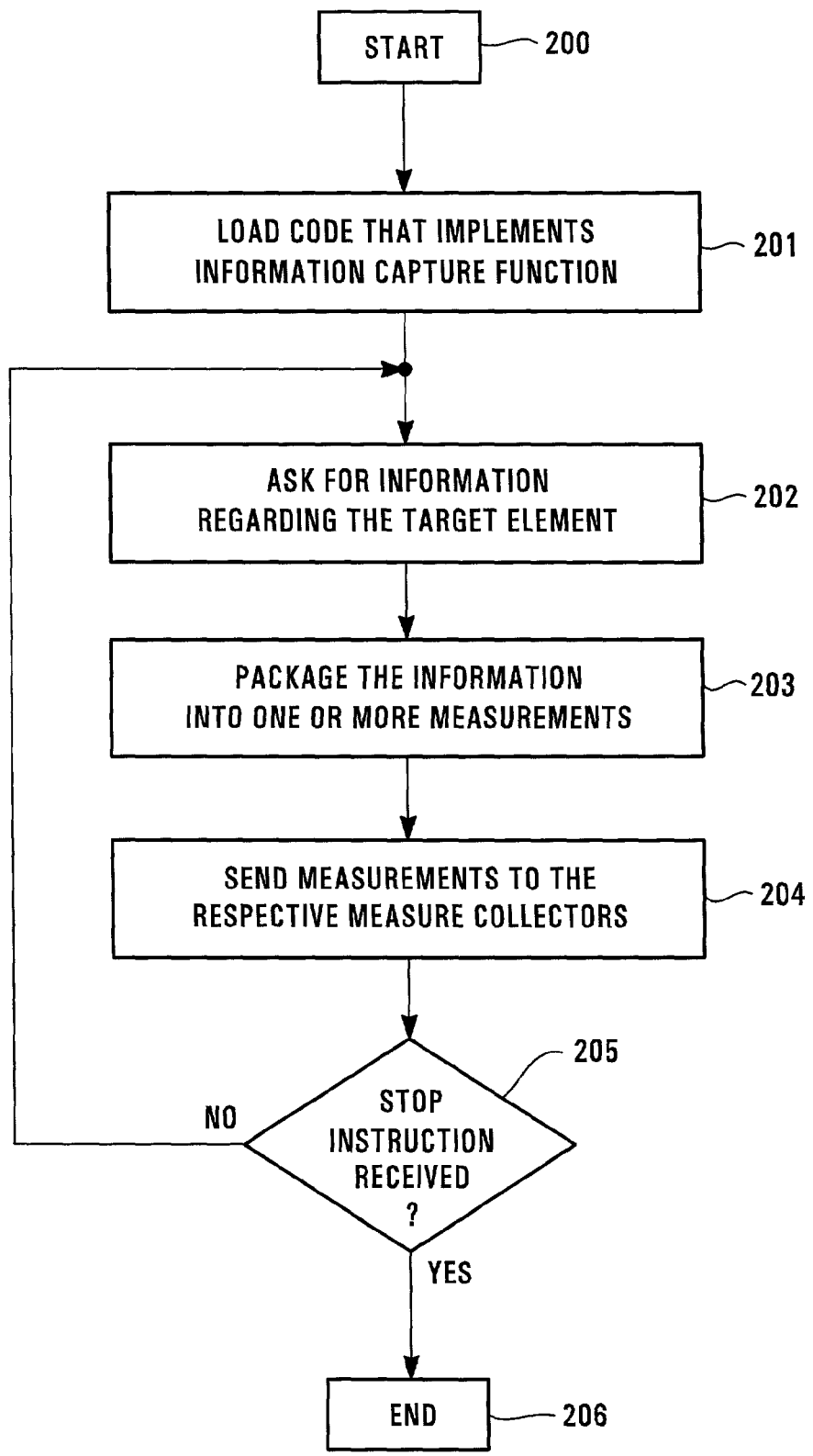
FIG. 8 shows in flowchart diagram form the process of any one of the sensors of FIG. 4.

Referring back to FIG. 4, the sensors 40-40n are logically wrapped around the element 11. This means that the sensors 40-40n may or may not be physically connected to the element 11. For example, some of the sensors 40-40n are inside the element 11 (e.g., operation counters within the software application) while others are placed around the element 11 to measure, for example, the traffic flow in and out of the element 11, or OS measurements of the impact of the software application, such as CPU or memory usage. Yet still other sensors can be placed in other elements (i.e., 12-15) to take measures that are related to the element 11. In other words, the sensors 40-40n only need to be logically related to the element 11. The placement of the sensors 40-40n as well as the manner in which the sensors 40-40n are taking measures are known in the art and are done using known technology. FIG. 8 also shows in flowchart diagram form the process of any one of the sensors 40-40n. The steps in FIG. 8 are self-explanatory and will not be described in more detail below. The sensors 40-40n will not be described in more detail below.

The number of the sensors 40-40n depend on the structure and operation of the element 11. Thus the number is element-specific or element-dependent. For example, in assessing how a web server is serving traffic, the element 11 is a web server, the sensors 40-40n are agents distributed over the Internet which retrieve data from the web server. In this case, the measures could be latency and throughput.

Figure 9A:
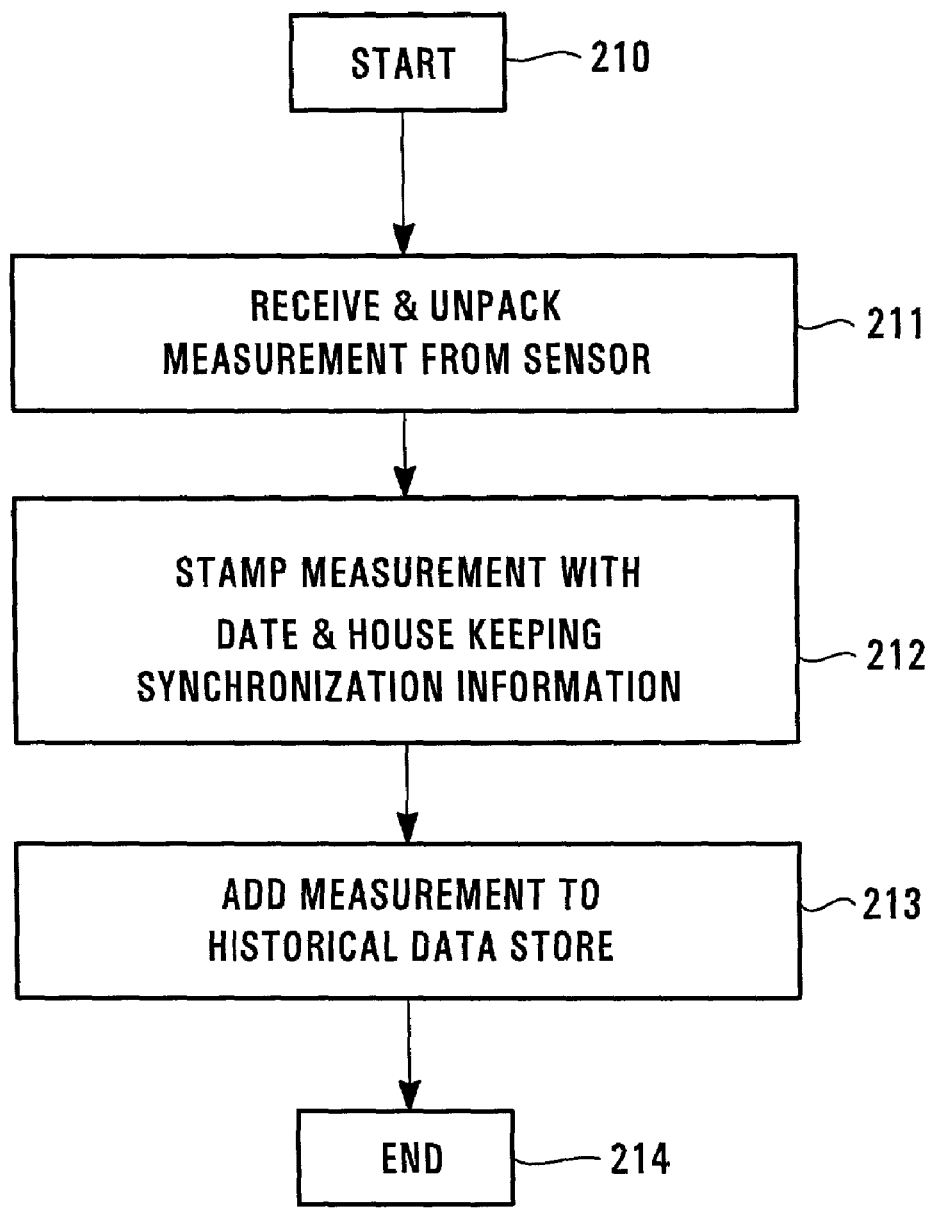
FIGS. 9A and 9B show in flowchart diagram form the processes of any one of the measure collectors of FIG. 4.

The measures taken by the sensors 40-40n are then collected by the measure collectors 50-50m. The functions of each of the collectors 50-50m basically include the data collection function and the data storage function. The data storage function allows the respective collector to store historical data of the measurement. The data storage function can be implemented by a buffer, a file, or a database. Each of the measure collectors 50-50m can be implemented using known technology. FIG. 9A shows in flowchart diagram form the process of any one of the measure collectors 50-50m for measurement collection and storage. The steps in FIG. 9A are self-explanatory and will not be described in more detail below.

Figure 9B:
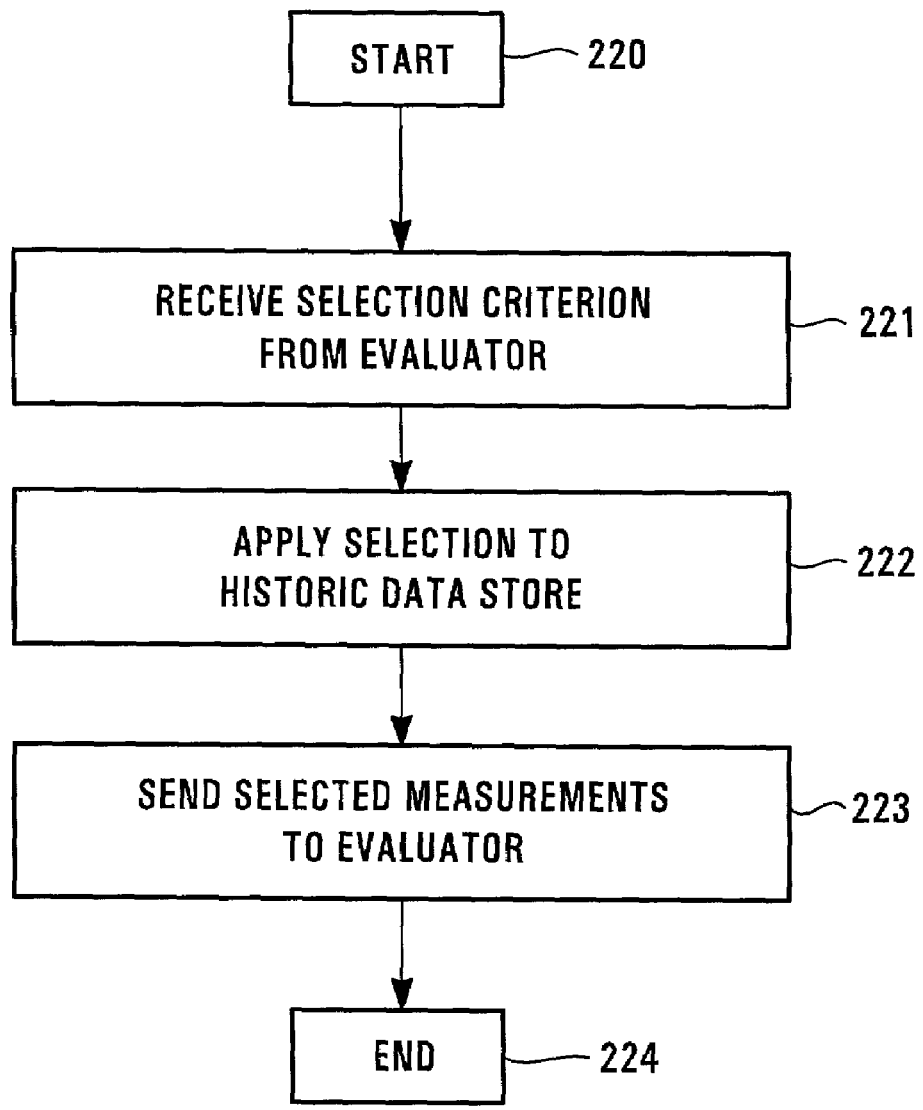

The measure collectors 50-50m then send their measures to the evaluators 60-60k for evaluation. FIG. 9B shows in flowchart diagram form the process of any one of the measure collectors 50-50m for sending the measurements to the respective evaluators. The steps in FIG. 9B are self-explanatory and will not be described in more detail below.

Referring back to FIG. 4, each of the evaluators 60-60k receives different number of measures from the different measure collectors 50-50m. For example, the evaluator 61 receives the measures from the collectors 50-50m while the evaluator 60 only receives the measures from the evaluators 50 and 51. Which evaluator receives which measure or measures depend on the definition of the respective evaluator. Each evaluation definition is a pre-configured definition written in, for example, the Java programming Language from Sun Microsystem, Inc. of Mountain View, Calif. Using the evaluation definition, the structure of each of the evaluators 60-60k can be dynamically changed by updating the evaluation definition of the respective evaluator. The evaluation definition will be described in more detail below, also in conjunction with FIG. 5.

Referring again to FIG. 4, each of the evaluators 60-60k receives any part of the measurement data collected and accumulated by the collectors 50-50m. Each of the evaluators 60-60k can be a statistical or absolute evaluator. This means that when each of the evaluators 60-60k is a statistical evaluator, it makes statistical evaluation or analysis (e.g., mean, standard deviation) on the historical measures it has received in the past to determine whether the current measures indicate that the element 11 is behaving normally or not. In other words, each of the evaluators 60-60k evaluates the present or current measures of the element 11, for example, by first determining the statistical distribution of the historical measures of the element 11 (i.e., the same measures but obtained in the past). In this case, the statistical distribution can be mean and standard deviation (or any other statistical calculation) of the historical measures. Then the evaluator compares the present measure against the statistical function of the historical measure to determine if the present or current measures are "normal" or not. Depending on that comparison, the evaluator generates the corresponding assessment in any definite discrete scale (e.g., GOOD/MEDIUM/BAD).

Below is an example evaluator used, when the element 11 is an email firewall system, to detect virus and mail loops. In this example, one mail log (i.e., postfix) is the only sensor. The mail log describes every action taken in the mail system. The mail log contains the information on when a message was received, from whom and to whom, the size of the message, when there was an attempt to deliver the message, and the status of the attempt (i.e., "sent", "deferred", or "bounced"). Thus, the sensor generates four measures from the mail log. They are (1) the rate of received messages during the time $T_0$; (2) the acceleration of the received messages; (3) the distribution of incoming message sizes; and (4) the ratio between the incoming messages and outgoing messages over the time period $T_0$.

Based on the above, the statistical computation of each of the evaluators 60-60k are
1. For the incoming messages, the average and standard deviation of the rate and acceleration is then computed over the past K hours.
2. The peak of the normalized distribution of message sizes is computed. This yields a number between 0 and 1. The average and standard deviation of this measure is computed over the past K hours.
3. The evaluation of the ratio between incoming and outgoing messages is then calculated as |1−(# of Incoming Messages)/(# of Outgoing Messages)|. The closer to zero the result, the higher the probability of a virus attack or mail loop.

The values of the evaluators for the incoming message rate and acceleration and for the message size peak distribution are determined as follows:

| Evaluator = | Good | if present Measure $\leq \mu + n_1 \times \sigma$ |
|---|---|---|
| | Medium | if $\mu + n_1 \times \sigma <$ present Measure $\leq \mu + n_2 \times \sigma$ |
| | Bad | if present Measure $> \mu + n_2 \times \sigma$ |
| | Unknown | if not enough past measures were available to compute $\mu$ and $\sigma$ | wherein $\mu$ is the computed mean value of the measure, $\sigma$ is the standard deviation, and $n_1 < n_2$ are predetermined constraints. The evaluator for the ration of incoming and outgoing messages is determined by:

| Evaluator = | OK | if present Measure $\geq \max(\mu - \sigma, \mu/2)$ |
|---|---|---|
| | NOT-OK | otherwise |
| | Unknown | if not enough past measures were available |

The structure of each of the evaluators 60-60k is described in more detail below, also in conjunction with FIG. 5.

Figure 5:
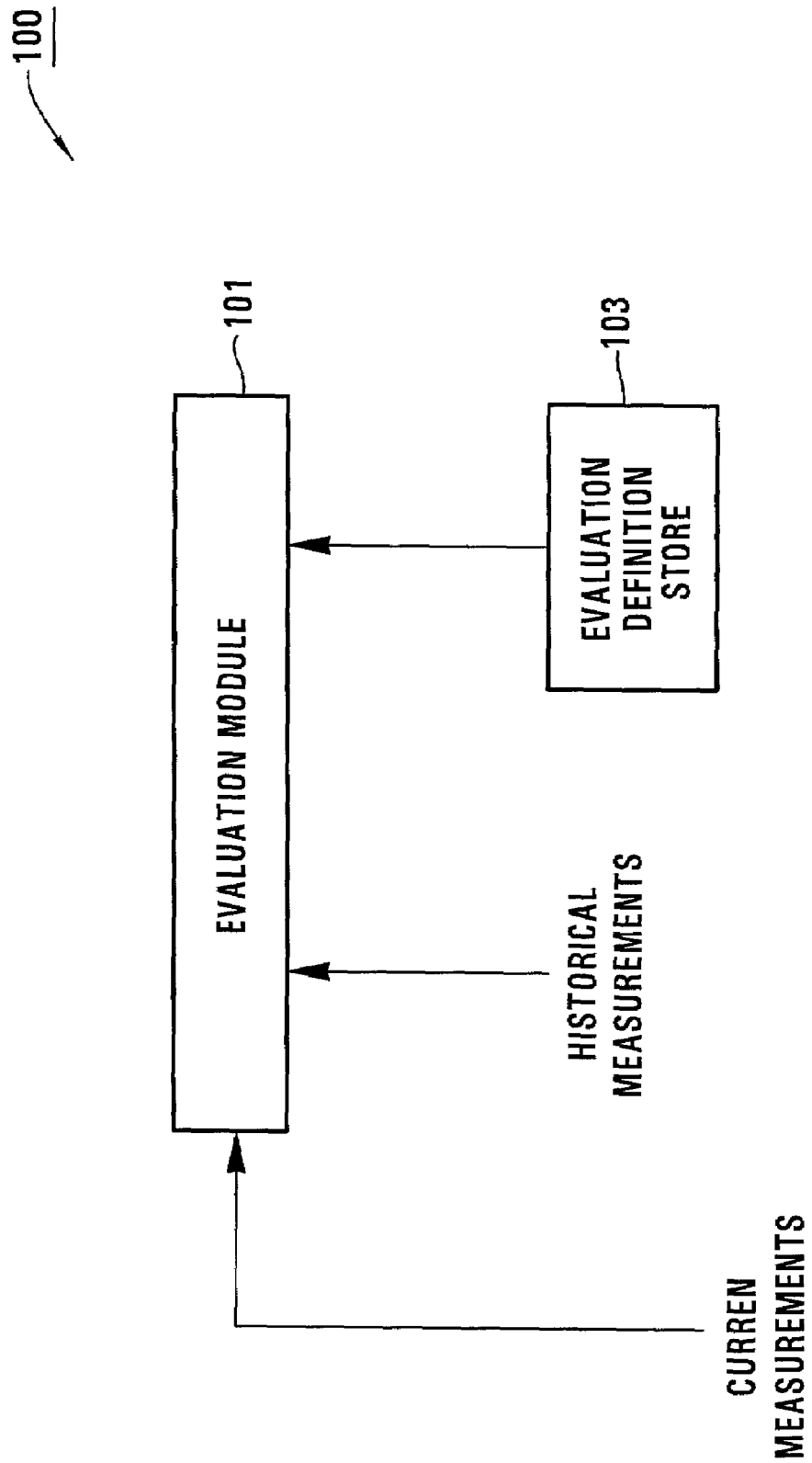
FIG. 5 shows the structure of any one of the evaluators of FIG. 4.

FIG. 5 shows an evaluator 100 which can be any one of the evaluators 60-60k of FIG. 4. As can be seen from FIG. 5, the evaluator 100 includes an evaluation module 101 and an evaluation definition store 103. The evaluation definition store 103 stores the evaluation definition of the evaluation module 101. The store 103 can be updated with new evaluation definition. This means that the structure of the evaluator 100 can be dynamically changed. Each of the modules 101-103 can be implemented using known technology.

Figure 10:
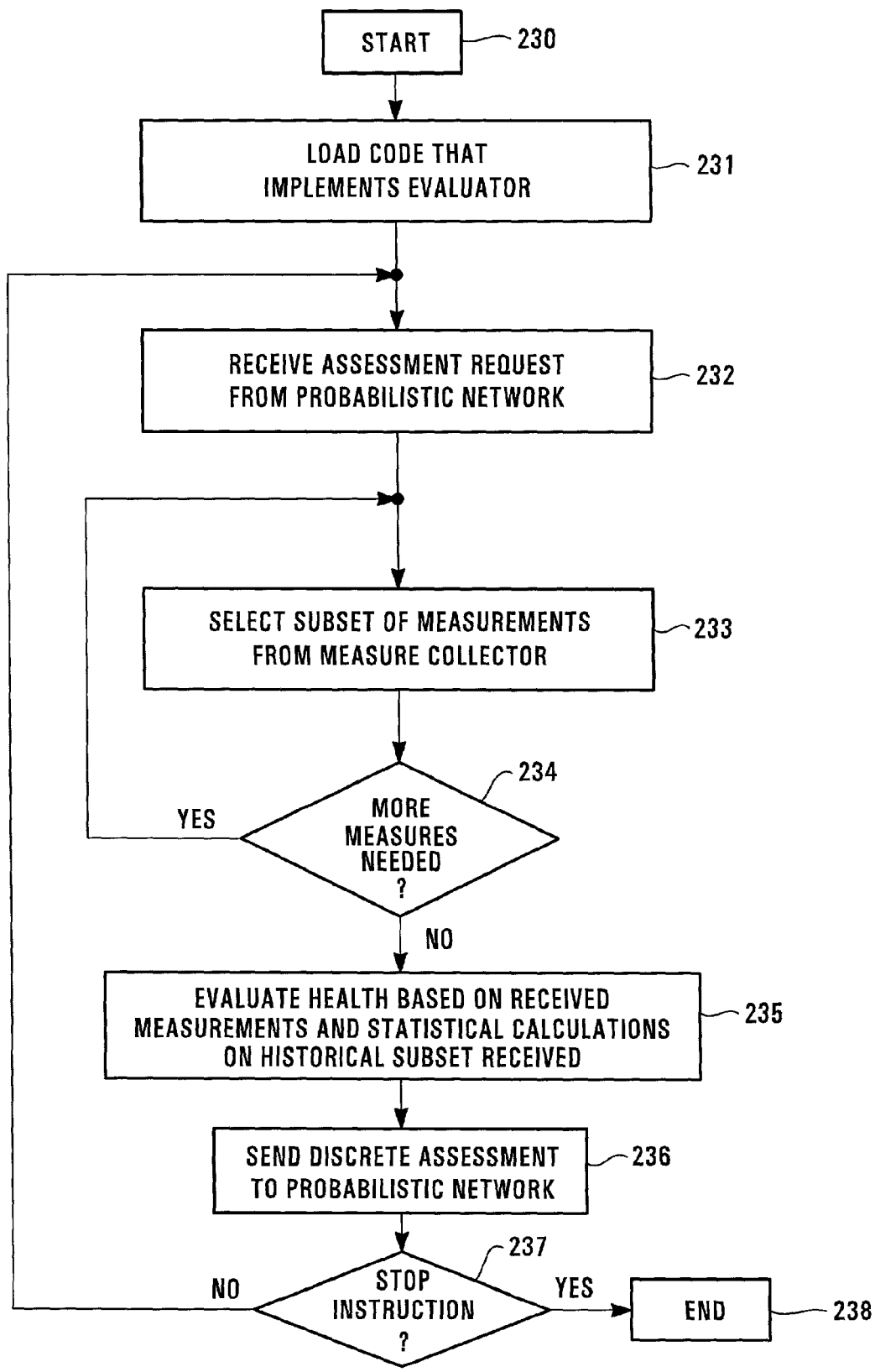
FIG. 10 shows in flowchart diagram form the process of the evaluation module of FIG. 5.

The evaluation module 101 is connected to the evaluation definition store 103. The evaluation module 101 also receives the present and historical measures from the measure collectors 50-50m. The evaluation module 101 is the module that performs the above described statistical analysis of the historical measures and then compare that with the current measures to produce an assessment. This has been described above, and will not be described in more detail below. FIG. 10 shows in flowchart diagram form the process of the evaluation module 101. The steps in FIG. 10 are self-explanatory and will not be described in more detail below.

Referring back to FIG. 4, the individual assessments from all of the evaluators 60-60k are then entered as evidence in the probabilistic reasoning network 70. The network is then asked to compute a probabilistic inference, and return the resulting probability for the top node. That probability is then output as the overall single health assessment of the element 11.

What the probabilistic reasoning network 70 does is to combine all the available individual assessments from the evaluators 60-60k using probabilistic reasoning analysis to estimate the overall health of the element 11. If some of them are missing for any reason, the probabilistic reasoning network 70 still functions correctly. The reasoning network 70 contains parameters that define how "trustworthy" each of the evaluators 60-60k is, and in what circumstances. The probabilistic reasoning network 70 then uses these probabilities to compute the overall probabilistic health report of the element 11. Training can be provided to allow the network 70 to pay, in this computation, less attention to those of the evaluators 60-60k that do not give statistically reliable assessments in the past.

In one embodiment, the reasoning network 111 is a Bayesian network Alternatively, other known probabilistic reasoning networks may be used. The structure of the network 70 is shown in FIG. 6, which will be described in more detail below.

Figure 6:
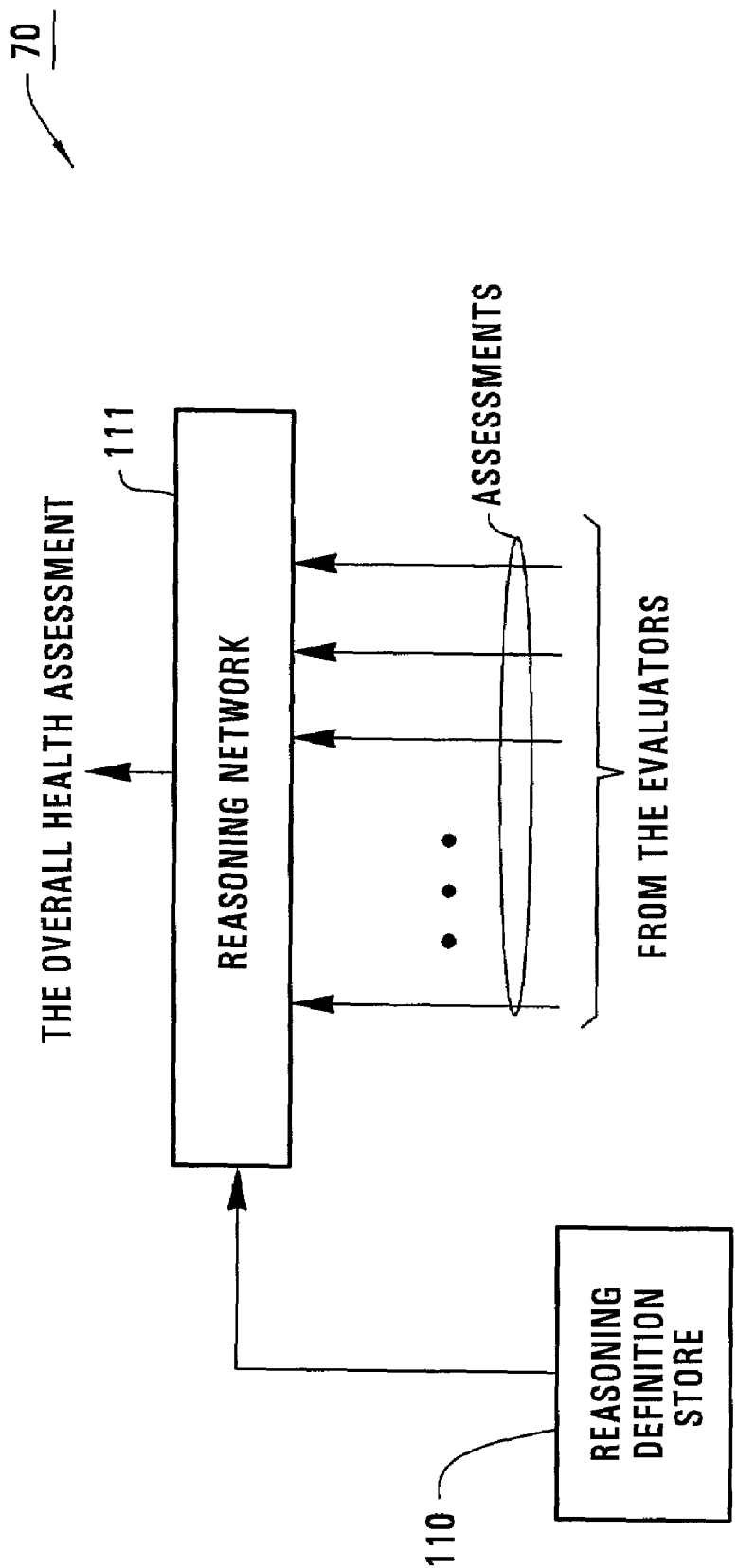
FIG. 6 shows the structure of the probabilistic reasoning network of FIG. 4.

As can be seen from FIG. 6, the probabilistic reasoning network 70 includes a reasoning definition store 110 that stores the reasoning definition of the network 70. The reasoning definition is a pre-configured one and is stored in the store 110. This means that the structure of the network 70 can be dynamically changed by storing a new reasoning definition in the store 110.

Figure 11:
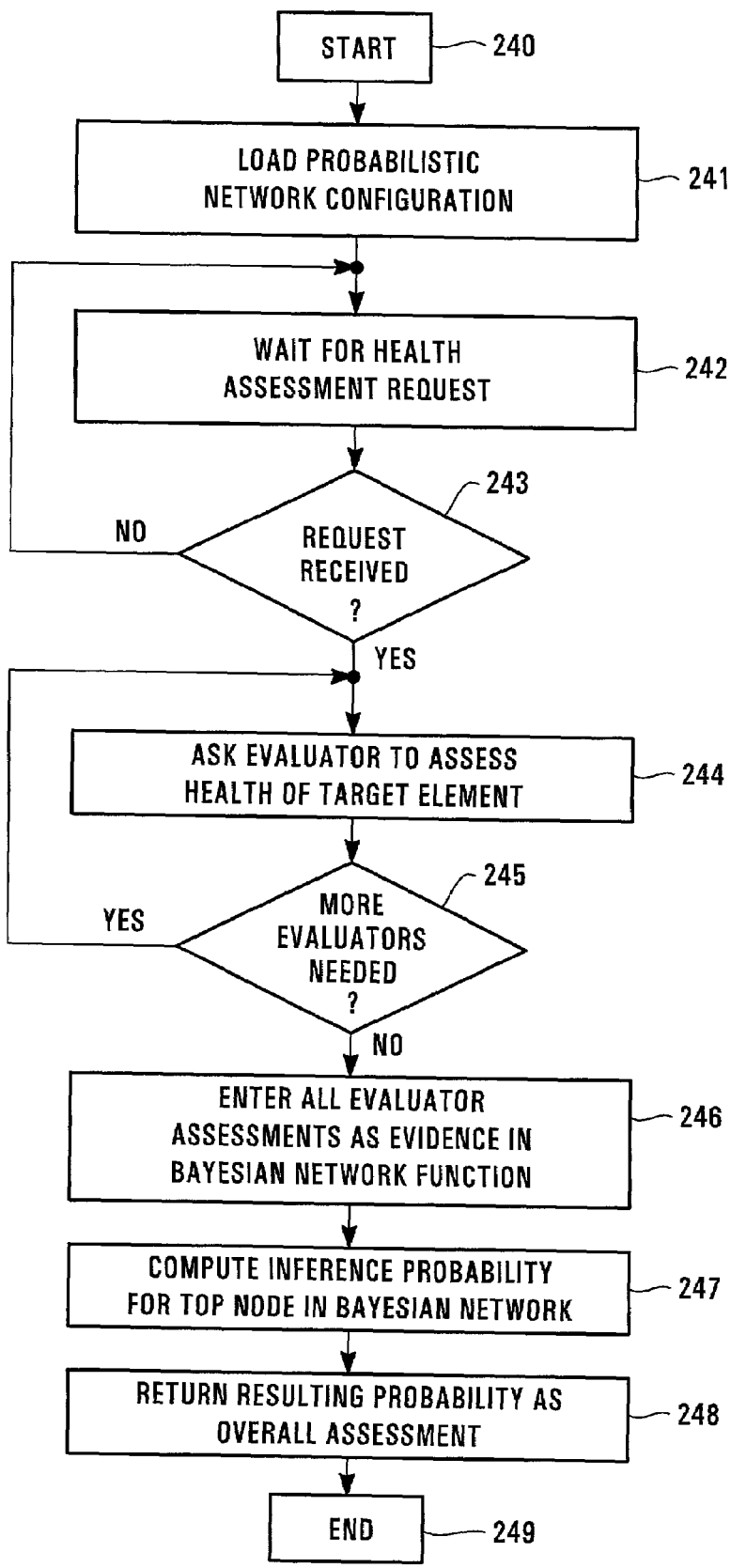
FIG. 11 shows in flowchart diagram form the process of the reasoning network of FIG. 6.

In addition, the probabilistic reasoning network 70 also includes a reasoning network 111. The reasoning network 111 receives all the individual assessments from the evaluators 60-60k (FIG. 4). FIG. 11 shows in flowchart diagram form the process of the reasoning network 111. The steps in FIG. 11 are self-explanatory and will not be described in more detail below.

In addition, the reasoning network 111 also receives the reasoning definition from the reasoning definition store 110. As described above, the reasoning definition determines how the reasoning network operates. Below shows an example reasoning definition that describes the reasoning network 111 in XML.

```
<?xml version="1.0" encoding="UTF-8"?>
<!DOCTYPE ANALYSISNOTEBOOK SYSTEM "http://sholey/xbn.dtd">
<ANALYSISNOTEBOOK ROOT="FuncRoot" NAME="Notebook.root">
 <BNMODEL NAME="FuncRoot">
  <STATICPROPERTIES>
   <FORMAT VALUE="MSR DTAS XML"/>
   <VERSION VALUE="0.2"/>
   <CREATOR VALUE="HP Labs ISAL"/>
  </STATICPROPERTIES>
```

```xml
<DYNAMICPROPERTIES>
  <PROPERTYTYPE TYPE="string" NAME="FFU">
    <COMMENT>ForFutureUse</COMMENT>
  </PROPERTYTYPE>
</DYNAMICPROPERTIES>
<VARIABLES>
  <VAR YPOS="12300" TYPE="discrete" XPOS="10500" NAME="root">
    <DESCRIPTION>ObjTequila.ESPnet</DESCRIPTION>
    <STATENAME>OK</STATENAME>
    <STATENAME>NOT_OK</STATENAME>
  </VAR>
  <VAR YPOS="13750" TYPE="discrete" XPOS="12002" NAME="EvalRecvdRate">
    <DESCRIPTION>ObjTequila.EvalRecvdRate</DESCRIPTION>
    <STATENAME>GOOD</STATENAME>
    <STATENAME>MEDIUM</STATENAME>
    <STATENAME>BAD</STATENAME>
  </VAR>
  <VAR YPOS="22450" TYPE="discrete" XPOS="10560" NAME="EvalSizePick">
    <DESCRIPTION>ObjTequila.EvalSizePick</DESCRIPTION>
    <STATENAME>GOOD</STATENAME>
    <STATENAME>MEDIUM</STATENAME>
    <STATENAME>BAD</STATENAME>
  </VAR>
  <VAR YPOS="24450" TYPE="discrete" XPOS="10560" NAME="EvalToFromRatio">
    <DESCRIPTION>ObjTequila.EvalToFromRatio</DESCRIPTION>
    <STATENAME>OK</STATENAME>
    <STATENAME>NOT_OK</STATENAME>
  </VAR>
  <VAR YPOS="24450" TYPE="discrete" XPOS="10560" NAME="EvalMaxSameSize">
    <DESCRIPTION>ObjTequila.EvalMaxSameSize</DESCRIPTION>
    <STATENAME>GOOD</STATENAME>
    <STATENAME>MEDIUM</STATENAME>
    <STATENAME>BAD</STATENAME>
  </VAR>
</VARIABLES>
<STRUCTURE>
  <ARC PARENT="root" CHILD="EvalRecvdRate"/>
  <ARC PARENT="root" CHILD="EvalSizePick"/>
  <ARC PARENT="root" CHILD="EvalToFromRatio"/>
  <ARC PARENT="root" CHILD="EvalMaxSameSize"/>
</STRUCTURE>
<DISTRIBUTIONS>
  <DIST TYPE="discrete">
    <PRIVATE NAME="root"/>
    <DPIS>
      <DPI>0.8 0.2</DPI>
    </DPIS>
  </DIST>
  <DIST TYPE="discrete">
    <CONDSET>
      <CONDELEM NAME="root"/>
    </CONDSET>
    <PRIVATE NAME="EvalRecvdRate"/>
    <DPIS>
      <DPI INDEXES="0">0.7 0.15 0.15</DPI>
      <DPI INDEXES="1">0.08 0.15 0.77</DPI>
    </DPIS>
  </DIST>
  <DIST TYPE="discrete">
    <CONDSET>
      <CONDELEM NAME="root"/>
    </CONDSET>
    <PRIVATE NAME="EvalSizePick"/>
    <DPIS>
      <DPI INDEXES="0">0.85 0.1 0.05</DPI>
      <DPI INDEXES="1">0.03 0.12 0.85</DPI>
    </DPIS>
  </DIST>
  <DIST TYPE="discrete">
    <CONDSET>
      <CONDELEM NAME="root"/>
    </CONDSET>
    <PRIVATE NAME="EvalToFromRatio"/>
```

-continued

```
<DPIS>
  <DPI INDEXES="0">0.75 0.25</DPI>
  <DPI INDEXES="1">0.45 0.55</DPI>
</DPIS>
    </DIST>
    <DIST TYPE="discrete">
      <CONDSET>
        <CONDELEM NAME="root"/>
      </CONDSET>
      <PRIVATE NAME="EvalMaxSameSize"/>
      <DPIS>
        <DPI INDEXES="0">0.8 0.15 0.05</DPI>
        <DPI INDEXES="1">0.15 0.15 0.7</DPI>
      </DPIS>
    </DIST>
  </DISTRIBUTIONS>
 </BNMODEL>
</ANALYSISNOTEBOOK>
```

The example described above is the reasoning networking description for the email example. This example is written in universal XML format for Bayesian network. The format is slightly modified to include the names of the evaluators in the "/DESCRIPTION" tag of the respective nodes.

Referring again to FIG. 6, the structure of the reasoning network 111 typically includes a number of variables linked together, each variable having a corresponding conditional probability table. The reasoning network 111 then performs the known Bayesian network inference computation. In other words, the reasoning network 111 combines all the individual assessments from the evaluators 60-60k together to estimate the overall health of the element 11. The reasoning network 111 can be implemented using any known probabilistic reasoning technology.

Figure 1:
FIG. 1 shows one prior art approach of monitoring a system with pre-defined static thresholds.

Referring back to FIG. 3, the result formatting module 31 and the web interface 32 are used to communicate the health assessment to remote user terminals, to other health assessment systems of the system 10 (FIG. 1), to any software application, or to the target element 11 itself. The result formatting module 31 formats the health assessment generated by the health engine 30 into a format recognized by the web interface 32 such that the web interface 32 can transmit the formatted health assessment to remote systems or terminals via the Internet (not shown in FIG. 3). This means that the web interface 32 is connected to the Internet, and is capable of transmitting data via the Internet using well known protocols. The structure of each of the result formatting module 31 and the web interface 32 is well known and can be implemented using known web service technology.

Briefly, the result formatting module 31 is an automatic web content generation module that uses the standard protocol language to generate web content. In this case, the generated content is the health assessment in web content format. The web interface 32 includes a web server or web infrastructure (not shown) that can service remote access requests sent from remote user terminals via the Internet. The web server of the web interface 32 can be the HP Chai web server manufactured by Hewlett-Packard Company of Palo Alto, Calif. The protocol and language used for the communication can be any one of the known open standard protocols and languages for Internet communication, which may include HTTP, HTML, or XML. With the web interface 32, the health assessment system 20 can easily communicate with other health assessment systems that monitor other elements of the target system 10 (FIG. 1) to exchange health information of the elements 11-15 (FIG. 1) such that each health assessment system can have an overall sense of the health of the entire target system 10. This is for the purposes of deciding whether to use each other's services or not.

In one embodiment, the protocol used is an instance of the XML protocol or language, and is referred to as Service Health Markup Language (SHML). In this case, the result formatting module 31, when receiving an inquiry from a remote system or terminal via the web interface 32, employs the SHML language to format the health assessment of the element 11. The result formatting module 31 then sends the formatted health assessment report to the web interface 32.

One of the key features of the SHML protocol is that it introduces the notion of health probability as a key concept. Another feature is that it allows the transfer of legacy and more detailed management information in its "details" clause. An example SHML health report (sent in response to an inquiry written in the same SHML language) is shown below for illustration purposes.

```
<?xml version="1.0" encoding="UTF-8"?>
<!DOCTYPE ServiceHealth SYSTEM
"http://sholey/shml.dtd"><ServiceHealth version="1.0">
<HealthResponse>
<Source    author-id="http://www.sholey.hp.com/"
    credentials="jdas"><?Source>
<Subject about-id="null" relation="self"></Subject>
<Time><ReportIssued timestamp="2:53:00 PM"></ReportIssued>
<PeriodCovered start="1:53:00 PM" end="1:53:10 PM"></PeriodCovered>
</Time>
<FunctionalSummary proba-ok="0.6"></FunctionalSummary>
<PerformanceSummary proba-ok="0.3"></PerformanceSummary>
<FunctionalDetail type="prose"></FunctionalDetail>
<PerformanceDetail type="prose"></PerformanceDetail>
</HealthResponse>
</ServiceHealth>
```

Here, the health assessment shows up in the "proba-ok" tag.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A health assessor for assessing health of a target element within a multi-element system, comprising:
   a plurality of sensors, each being operatively coupled to the target element to produce a measure of the target element;
   a plurality of measure collectors, each collecting a measure from one of the sensors, wherein each of the collectors also stores the measure as historical measure;
   a plurality of evaluators, each evaluating at least a subset of all the measures collected by the measure collectors in accordance with a pre-configured evaluation definition for the respective evaluator to provide an assessment;
   a probabilistic reasoning network coupled to the evaluators to receive the assessment from each of the evaluators and to analyze the assessments in accordance with a pre-configured reasoning definition so as to provide an overall probabilistic health assessment of the target element, the probabilistic reasoning network to analyze the assessments from the evaluators according to information indicating reliabilities of the respective evaluators.

2. The health assessor of claim 1, wherein the evaluation definition of an evaluator determines which of the measures collected by all of the measure collectors are to be received by the respective evaluator.

3. The health assessor of claim 1, wherein each of the evaluators further comprises
   an evaluation definition store that stores the pre-configured evaluation definition of the evaluator;
   an evaluation module coupled to the evaluation definition store to provide the assessment by statistically comparing the subset of the measures and the historical measures based on the pre-configured evaluation definition.

4. The health assessor of claim 3, wherein the operation of an evaluator can be changed by replacing the pre-configured evaluation definition for that evaluator with a new evaluation definition.

5. The health assessor of claim 1, wherein the reasoning network is a Bayesian network probabilistic reasoning network.

6. The health assessor of claim 1, wherein the overall probabilistic health assessment of the target element is a probability that the target element is healthy.

7. The health assessor of claim 1, wherein the operation of the probabilistic reasoning network can be changed by replacing the pre-configured reasoning definition with a new reasoning definition.

8. The health assessor of claim 1, wherein the evaluation definition of a first one of the evaluators specifies that the first evaluator is to receive measures from a first group of the measure collectors, and the evaluation definition of a second one of the evaluators specifies that the second evaluator is to receive measures from a second, distinct group of the measure collectors.

9. A health assessment system for assessing health of a target element within a multi-element system, comprising:
   a health assessment engine that receives measures of the target element, the health assessment engine having a probabilistic reasoning network to provide health assessment of the target element based on the received measures and historical measures of the target element, wherein the historical measures have already been stored in the health assessment engine;
   a result formatting module that formats the health assessment into a report;
   a web interface that transmits the formatted report to a remote access system via the Internet.

10. The health assessment system of claim 9, wherein the health assessment engine further comprises
    a plurality of sensors, each being operatively coupled to the target element to produce a measure of the target element;
    a plurality of measure collectors, each collecting a measure from one of the sensors, wherein each of the collectors also stores the measure as historical measure;
    a plurality of evaluators, each evaluating at least a subset of all the measures collected by the measure collectors in accordance with a (1) pre-configured evaluation definition for the respective evaluator and (2) at least a subset of all historical measures of the target element that have already been stored in the collector to provide an assessment;
    wherein the probabilistic reasoning network is coupled to the evaluators to receive the assessment from each of the evaluators and to analyze all the assessments in accordance with a pre-configured reasoning definition so as to provide an overall health assessment of the target element.

11. The health assessment system of claim 10, wherein each of the evaluators further comprises
    an evaluation definition store that stores the pre-configured evaluation definition of the evaluator;
    an evaluation module coupled to the evaluation definition store to provide the assessment by statistically comparing the subset of the measures and the historical measures based on the pre-configured evaluation definition.

12. The health assessment system of claim 11, wherein the operation of an evaluator can be changed by replacing the pre-configured evaluation definition for that evaluator with a new evaluation definition.

13. The health assessment system of claim 9, wherein the probabilistic reasoning network is a Bayesian network probabilistic reasoning network.

14. The health assessment system of claim 13, wherein the probabilistic reasoning network further comprises a reasoning definition store that stores a pre-configured reasoning definition, wherein the pre-configured reasoning definition defines how the probabilistic reasoning network should analyze all the assessments received from the evaluators to produce the overall health assessment of the target element.

15. The health assessment system of claim 14, wherein the operation of the probabilistic reasoning network can be changed by replacing the pre-configured reasoning definition with a new reasoning definition.

16. The health assessment system of claim 9, wherein the remote access system is the target element.

17. The health assessment system of claim 9, wherein the remote access system is a remote access terminal or an application.

18. The health assessment system of claim 9, wherein the health assessment engine further comprises sensors to provide the measures, measure evaluators to provide assessments based on the measures from the sensors and the historical measures,
    wherein the probabilistic reasoning network generates the health assessment based on the assessments provided by the measure evaluators and based on information indicating trustworthiness of respective measure evaluators.

19. The health assessment system of claim 9, wherein the result formatting module formats the health assessment into an XML report.

* * * * *

UNITED STATES PATENT AND TRADEMARK OFFICE
CERTIFICATE OF CORRECTION

| | |
|---|---|
| PATENT NO. | : 7,426,502 B2 |
| APPLICATION NO. | : 09/882581 |
| DATED | : September 16, 2008 |
| INVENTOR(S) | : Alexandre Bronstein et al. |

It is certified that error appears in the above-identified patent and that said Letters Patent is hereby corrected as shown below:

On the title page, item (75), in "Inventors", in column 1, line 2, delete "Palo Alto" and insert -- Redwood City --, therefor.

Signed and Sealed this

Twenty-eighth Day of April, 2009

JOHN DOLL
*Acting Director of the United States Patent and Trademark Office*